(12) United States Patent
Matsunaga

(10) Patent No.: US 11,069,241 B2
(45) Date of Patent: Jul. 20, 2021

(54) DRIVING SUPPORT DEVICE AND DRIVING SUPPORT METHOD

(71) Applicant: DENSO CORPORATION, Kariya (JP)

(72) Inventor: Shogo Matsunaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 16/065,460

(22) PCT Filed: Dec. 22, 2016

(86) PCT No.: PCT/JP2016/088578
§ 371 (c)(1),
(2) Date: Jun. 22, 2018

(87) PCT Pub. No.: WO2017/111135
PCT Pub. Date: Jun. 29, 2017

(65) Prior Publication Data
US 2019/0005821 A1 Jan. 3, 2019

(30) Foreign Application Priority Data
Dec. 25, 2015 (JP) .............................. JP2015-254446

(51) Int. Cl.
*G08G 1/16* (2006.01)
*G01S 13/931* (2020.01)
(Continued)

(52) U.S. Cl.
CPC .............. *G08G 1/166* (2013.01); *G01S 13/42* (2013.01); *G01S 13/589* (2013.01);
(Continued)

(58) Field of Classification Search
CPC ......... B60W 2420/52; B60W 2420/42; B60W 30/0956; B60W 30/09; B60W 30/08;
(Continued)

(56) References Cited

U.S. PATENT DOCUMENTS 7,881,868 B2 * 2/2011 Greene .................. G08G 1/166
340/435
8,581,776 B2 * 11/2013 Tsunekawa ............... G01S 7/40
342/104
(Continued)

FOREIGN PATENT DOCUMENTS

JP 10-96775 A 4/1998
JP 2007279892 A * 10/2007
(Continued)

*Primary Examiner* — Angelina Shudy
*Assistant Examiner* — Mohamed Abdo Algehaim
(74) *Attorney, Agent, or Firm* — Maschoff Brennan

(57) ABSTRACT

In a driving support device for a vehicle, a collision prediction unit uses a determination plane defined by a lateral position axis indicating a position with respect to a vehicle in a lateral direction orthogonal to a vehicle traveling direction and a prediction time period axis indicating a time-to-collision set in the vehicle traveling direction. The collision prediction unit establishes a collision prediction area as an area in the determination plane. Further, the collision prediction unit determines whether at least a part of the section between both ends of a target is within the collision prediction area in the determination plane. Depending on the determination, the collision prediction unit predicts a collision with the target. The width of the collision prediction area along a lateral position axis is set based on the width of the vehicle. The lateral position of the collision prediction area is set based on a product between the speed of the target and the time-to-collision.

19 Claims, 6 Drawing Sheets

(51) Int. Cl.
  *G01S 13/58* (2006.01)
  *G01S 13/86* (2006.01)
  *G01S 13/42* (2006.01)
  *B60W 30/095* (2012.01)

(52) U.S. Cl.
  CPC .......... *G01S 13/867* (2013.01); *G01S 13/931* (2013.01); *G08G 1/165* (2013.01); *B60W 30/0956* (2013.01); *B60W 2420/42* (2013.01); *B60W 2420/52* (2013.01); *G01S 2013/93185* (2020.01); *G01S 2013/93271* (2020.01)

(58) Field of Classification Search
  CPC .......... B60W 30/0953; B60W 30/095; B60W 30/16; B60W 30/17; B60W 60/0017; B60W 60/0027; B60W 2554/40; B60W 2554/4029; B60W 2554/4041; B60W 2554/4043; G08G 1/166; G08G 1/165; G01S 13/42; G01S 13/867; G01S 13/589; G01S 13/931; G01S 2013/9346; G01S 2013/9375; G01S 15/93; G01S 13/93; G01S 17/93; G01S 2013/93185; G01S 2013/93271; G05D 3/1454; G05D 1/0088; G05D 1/0289
  USPC ........................................................ 701/301
  See application file for complete search history.

(56) References Cited

U.S. PATENT DOCUMENTS

| | | | |
|---|---|---|---|
| 9,975,550 B2 * | 5/2018 | Katoh | G06T 7/60 |
| 9,994,220 B2 * | 6/2018 | Suzuki | B60W 30/16 |
| 10,421,398 B2 * | 9/2019 | Igarashi | H04N 13/254 |
| 2004/0193351 A1 * | 9/2004 | Takahashi | B60T 7/22 |
| | | | 701/70 |
| 2006/0062432 A1 * | 3/2006 | Watanabe | G08G 1/163 |
| | | | 382/104 |
| 2007/0129891 A1 * | 6/2007 | Yano | B60W 10/196 |
| | | | 701/301 |
| 2008/0243389 A1 * | 10/2008 | Inoue | G08G 1/165 |
| | | | 701/301 |
| 2011/0133915 A1 * | 6/2011 | Ito | B60Q 1/525 |
| | | | 340/435 |
| 2014/0288816 A1 * | 9/2014 | Hayasaka | B60W 10/18 |
| | | | 701/301 |
| 2014/0343750 A1 * | 11/2014 | Minemura | B60W 50/04 |
| | | | 701/1 |
| 2015/0307093 A1 * | 10/2015 | Sasabuchi | B60W 10/20 |
| | | | 701/1 |
| 2015/0353133 A1 * | 12/2015 | Mukai | B60W 30/09 |
| | | | 701/41 |
| 2016/0075332 A1 * | 3/2016 | Edo-Ros | B60T 7/22 |
| | | | 701/70 |
| 2016/0101779 A1 * | 4/2016 | Katoh | B60W 30/0956 |
| | | | 340/435 |
| 2017/0221188 A1 * | 8/2017 | Aoki | G01C 3/06 |
| 2019/0001973 A1 * | 1/2019 | Matsunaga | G08G 1/16 |
| 2019/0103017 A1 * | 4/2019 | Ohta | B60Q 1/04 |
| 2019/0366924 A1 * | 12/2019 | Yoshihara | G08G 1/167 |

FOREIGN PATENT DOCUMENTS

| | | |
|---|---|---|
| JP | 2007-79892 A | 10/2008 |
| JP | 2008-242544 A | 10/2008 |
| JP | 2011-118753 A | 6/2011 |
| JP | 2011-196943 | 10/2011 |
| JP | 2012-048460 A | 3/2012 |
| JP | 2012048460 A * | 3/2012 |
| JP | 2015-032028 | 2/2015 |

* cited by examiner

FIG.1
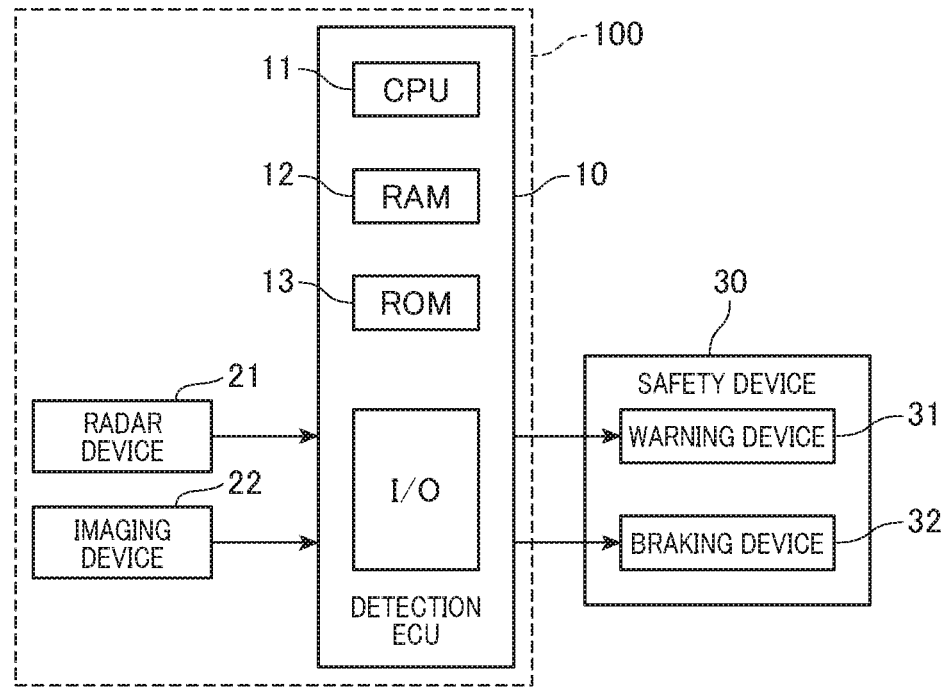
(a)
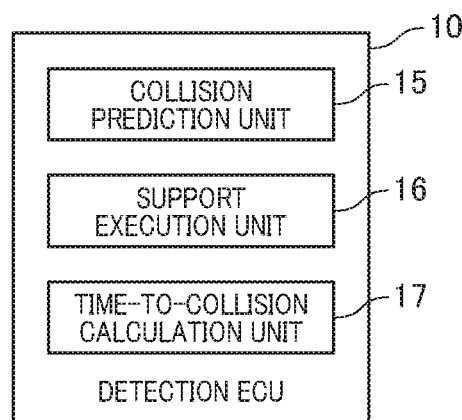
(b)

DRIVING SUPPORT DEVICE AND DRIVING SUPPORT METHOD

CROSS-REFERENCE TO RELATED APPLICATION

This patent application is based on Japanese Patent Application No. 2015-254446, filed on Dec. 25, 2015, in the Japan Patent Office, the entire disclosure of which is hereby incorporated by reference herein.

BACKGROUND

Technical Field

The present disclosure relates to a driving support device that is mounted to a vehicle to detect a target (object) ahead of the vehicle and causes the vehicle to perform driving support, and a driving support method.

Background Art

In recent years, along with the advancement of sensors and data processing, vehicles have been equipped with a driving support device to avoid collision accidents caused by the entry of a target into the traveling direction of the vehicle from the lateral direction. For example, PTL 1 describes a driving support device that increases a detection area to detect a target when the lateral movement speed of the target approaching the vehicle from the lateral direction with respect to the traveling direction of the vehicle is equal to or higher than a predetermined speed and when the distance between the target and the vehicle is equal to or shorter than a predetermined distance. The detection area is within a range in which both a camera and a radar can detect the target, which makes it possible to detect the laterally moving target with high accuracy.

CITATION LIST

Patent Literature

[PTL 1] JP 2012-48460 A

As described above, the driving support device described in PTL 1 increases the detection area according to the distance and speed of a target when the target is approaching the vehicle from the lateral direction with respect to the traveling direction of the vehicle, thereby to detect the target laterally approaching to the traveling direction of the vehicle. However, when an object with large lateral width is approaching toward the traveling direction of the vehicle, the central position of the object used as the position of the object and the range of presence of the object may become misaligned, and appropriate driving support may not be performed.

SUMMARY

A major objective of the present disclosure is to provide a driving support device and a driving support method that make it possible to, even when a target with large lateral width is approaching toward the traveling direction of the vehicle, determine a collision between the vehicle and the target with high accuracy.

A first aspect of the present disclosure is a driving support device including: a target detection unit that detects a target moving in a direction crossing the traveling direction of a vehicle; a collision prediction unit that predicts a collision between the target detected by the target detection unit and the vehicle; a support performing unit that, when the collision prediction unit predicts a collision between the target and the vehicle, causes the vehicle to perform driving support for preventing the collision; a speed calculation unit that calculates the speed of the target; a time-to-collision calculation unit that calculates a time-to-collision as a prediction time period until the occurrence of a collision between the target and the vehicle based on information about the target detected by the target detection unit; and a both-ends detection unit that detects both ends of the target detected by the target detection unit in a direction orthogonal to the traveling direction of the vehicle. The collision prediction unit establishes a collision prediction area as an area in a determination plane defined by a lateral position axis indicating a lateral position with respect to the vehicle in a lateral direction orthogonal to the traveling direction of the vehicle and a prediction time period axis indicating the time-to-collision set in the traveling direction of the vehicle. The collision prediction unit predicts a collision with the target depending on whether at least a part of the section between both ends detected by the both-ends detection unit is within the collision prediction area. The width of the collision prediction area along the lateral position axis is set based on the width of the vehicle. The lateral position of the collision prediction area is set based on the speed of the target calculated by the speed calculation unit and the time-to-collision.

When the target detection unit detects a target moving in the direction crossing the traveling direction of the vehicle, the both-ends detection unit detects the both ends of the target in the direction orthogonal to the traveling direction of the vehicle. The collision prediction area is established from the lateral position as the position of the target relative to the vehicle in the lateral direction orthogonal to the traveling direction of the vehicle and the time-to-collision. The width of the collision prediction area along the lateral position axis is set based on the width of the vehicle. This makes it possible to determine that a target present at a position exceeding the width along the lateral position axis is unlikely to collide with the vehicle. In addition, setting the lateral position of the collision prediction area based on the speed of a target and the time-to-collision makes it possible to predict with high accuracy whether the target moving at the current speed is likely to collide with the vehicle. Further, a collision with the target is predicted depending on whether at least a part of the section between the both ends of the target detected by the both-ends detection unit is within the collision prediction area. Accordingly, even when a target with large lateral width is approaching toward the traveling direction of the vehicle, it is possible to determine a collision between the vehicle and the target with high accuracy. Moreover, it is possible to make an appropriate determination on whether to perform the driving support.

BRIEF DESCRIPTION OF THE DRAWINGS

The above and other objects, features, and advantageous effects of the present disclosure will become clearer from the following detailed description with reference to the accompanying drawings. In the drawings:

FIG. 1 is a set of block diagrams, in which part (a) thereof illustrates a block diagram of a hardware of a driving support device, and part (b) thereof illustrates a functional block diagram of a detection ECU, according to the present embodiment.

DESCRIPTION OF PREFERRED EMBODIMENTS

Figure 2:
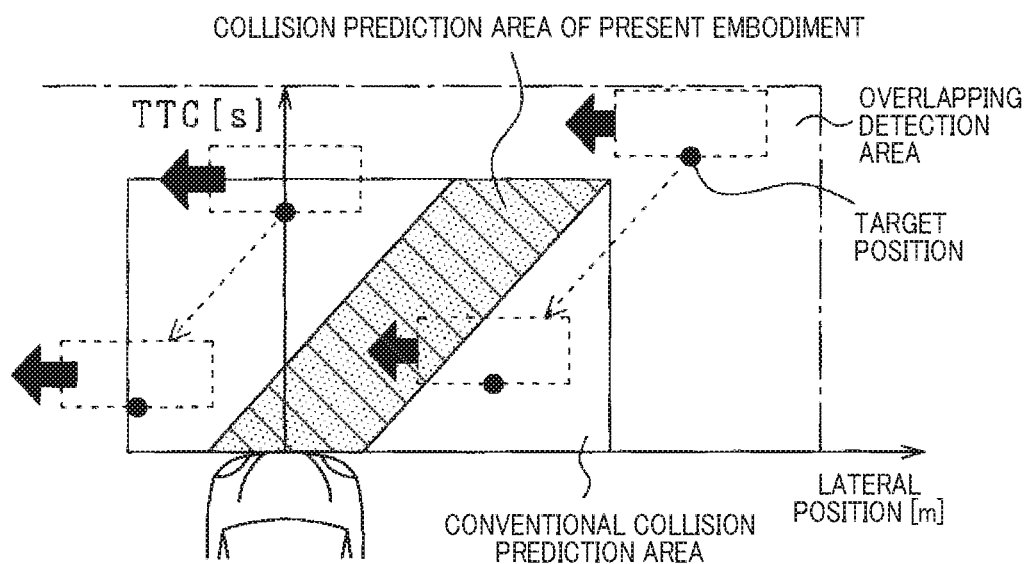
FIG. 2 is a diagram illustrating a problem that may occur under control of a conventional detection ECU.

The driving support device according to the present embodiment is mounted to a vehicle (own vehicle) to detect a target around the own vehicle, such as ahead of the own vehicle, and perform a driving support control. The driving support control serves as a PCS system (pre-crash safety system) to avoid a collision with a target or reduce collisional damage.

Referring to part (a) of FIG. 1, a driving support device 100 includes a detection ECU (electronic control unit) 10 and a radar device 21, and an imaging device 22.

The radar device 21 is a publicly known millimeter wave radar, for example, that uses a high frequency signal in the millimeter waveband as transmission wave. The radar device 21 is disposed at the front end part of the own vehicle to detect the position of a target (called radar detection target) in an area at a predetermined detection angle as target-detectable range. Specifically, the radar device 21 transmits search waves at predetermined intervals and receives reflected waves from a plurality of antennas. The radar device 21 calculates the distance to the radar detection target by the transmission time of the search waves and the reception time of the reflected waves. The radar device 21 also calculates the relative speed (specifically, the relative speed in the traveling direction of the vehicle) from the frequencies of the reflected wave from the radar detection target, which vary by Doppler Effect. In addition, the radar device 21 calculates the azimuth of the radar detection target from phase differences among the reflected waves received by the plurality of antennas. When the position and azimuth of the radar detection target can be calculated, the position of the radar detection target relative to the own vehicle (lateral position) can be specified. Accordingly, the radar device 21 corresponds to a target detection unit and a speed calculation unit. The radar device 21 transmits the search waves, receives the reflected waves, and calculates the reflection positions and the relative speed at the predetermined intervals, and transmits the calculated reflection positions and relative speed to the detection ECU 10.

The imaging device 22 is formed from, for example, a charged-coupled device (CCD) camera, a complementary metal-oxide semiconductor (CMOS) image sensor, a near-infrared camera, and others. In that case, the image capture device 22 is mounted to a predetermined vertical position of the own vehicle that is the center of the own vehicle in the lateral direction to capture a bird's-eye-view image of a region increasing with a predetermined angular range ahead of the own vehicle. The imaging device 22 extracts a feature point indicating the presence of a target (called image detection target) in the captured image. Specifically, the imaging device 22 extracts edge points based on information about brightness of the captured image, and applies a Hough transform to the extracted edge points. In the Hough transform, for example, points of a straight line where a plurality of edge points are continuously arrayed, or points of intersections between straight lines are extracted as feature points. The imaging device 22 captures images and extracts a feature point, and transmits the results of extraction of the feature points to the detection ECU 10, at regular intervals. The imaging device 22 may be a monocular camera or a stereo camera. In this way, the radar device 21 and the imaging device 22 detect a target moving in the direction crossing the traveling direction of the own vehicle.

The radar device 21 and the imaging device 22 are connected to the detection ECU 10. The detection ECU 10 is a computer including a CPU (central processing unit) 11, a RAM (random access memory) 12, a ROM (read only memory) 13, and an I/O (input/output) (not illustrated), and others. The detection ECU 10 performs these functions by the CPU 11 executing a program installed on the ROM 13. In the present embodiment, the program installed in the ROM 13 is a determination program for determining whether the radar detection target and the image detection target are identical based on the information about the radar detection target and the information about the image detection target.

Specifically, the detection ECU 10 establishes a correlation between a radar-detection target position that is a position obtained from a radar-detection target and an image-detection target position that is a feature point obtained from an image-detection target. Specifically, if these positions are located close to each other, they are correlated to each other as being based on an identical target. When the image detection target position is present in the vicinity of the radar-detection target position (in the present embodiment, the distance between the radar-detection target position and the image-detection target position is within a predetermined range), there is a high probability that the target is actually present at the radar-detection target position. The state in which the position of the target can be accurately acquired by the radar device 21 and the imaging device 22 will be called a fusion state. For a target determined as in the fusion state, the detection ECU 10 determines that the target is present at that position.

Under the determination program installed on the ROM 13, when determining that the target is present at that position, the detection ECU 10 then determines whether to perform a prescribed driving support process on guard against a collision with the target. The ROM 13 corresponds to a non-transitory computer readable recording medium. Besides the ROM 13, the recording medium includes computer-readable electronic media such as DVD-ROM (digital versatile disk read only memory), CD-ROM (compact disc read only memory), and hard disk. As illustrated in part (b) of FIG. 1, the detection ECU 10 performs various functions by a collision prediction unit 15, a support performing unit 16, and a time-to-collision calculation unit 17.

In the present embodiment, the driving support process corresponds to a warning process which notifies the driver of a target ahead of the own vehicle that may collide with the own vehicle and a braking process which is applied to brake to the own vehicle. Therefore, the own vehicle is equipped with a warning device 31 and a braking device 32 as safety devices 30 that are driven under control demand from the detection ECU 10.

The warning device 31 includes a speaker and a display mounted to the interior of the own vehicle. When the detection ECU 10 determines that a time-to-collision (TTC) described later becomes shorter than a first predetermined time and the probability of a collision of the own vehicle with a target becomes high, the warning device 31 outputs a warning sound, a warning message, or the like to notify the driver of the risk of a collision. Such a warning sound, a warning message, or the like is outputted according to a control command from the detection ECU 10. Accordingly, the warning device 31 corresponds to a notification unit.

The braking device 32 is a device that serves as a brake for the own vehicle. When the detection ECU 10 determines that the time-to-collision described later becomes shorter than a second predetermined time set to be shorter than the first predetermined time, and the probability of a collision of the own vehicle with a target becomes high, the braking device 32 is activated under a control command from the detection ECU 10. Specifically, the braking device 32 enhances braking force derived from a brake operation by the driver (brake assist function) or automatically applies a brake if the driver does not perform a brake operation (automatic braking function). Accordingly, the braking device 32 corresponds to an automatic braking unit.

The time-to-collision calculation unit 17 of the detection ECU 10 calculates the time-to-collision as a time before the target will collide with the own vehicle. Specifically, the time-to-collision calculation unit 17 calculates the time-to-collision based on the relative distance and relative speed of the target and the own vehicle. As illustrated in FIG. 2, the time-to-collision calculation unit 17 establishes an overlapping detection area in which an area where the radar device 21 can detect a target and an area where the imaging device 22 can detect a target overlap in a determination plane. The determination plane is defined by a longitudinal axis indicating the time-to-collision (TTC), and a horizontal axis indicating the lateral position of the target with respect to the own vehicle in the lateral direction orthogonal to (crossing) the traveling direction of the own vehicle.

However, not all targets present in the overlapping detection area have a risk of colliding with the own vehicle. Therefore, a target within a collision prediction area set to further limit the overlapping detection area is recognized as a target that may collide with the own vehicle. In the determination plane, the target is specified as a point (current position) by the lateral position and the time-to-collision. As illustrated in the rectangular frame, it may be determined that a target within a conventional collision prediction area established by setting thresholds for the lateral position and the time-to-collision is a target that might collide with the own vehicle. As indicated by a hatched area, however, the area having a high probability of collision with the own vehicle is narrower than the collision prediction area. Accordingly, even when the target crosses the traveling direction of the own vehicle without contacting the own vehicle, or when the own vehicle passes through the moving direction of the target before the entry of the target into the traveling direction of the own vehicle, the driving support process may be performed although the target is within the collision prediction area and there will be no collision between the target and the own vehicle.

Figure 3:
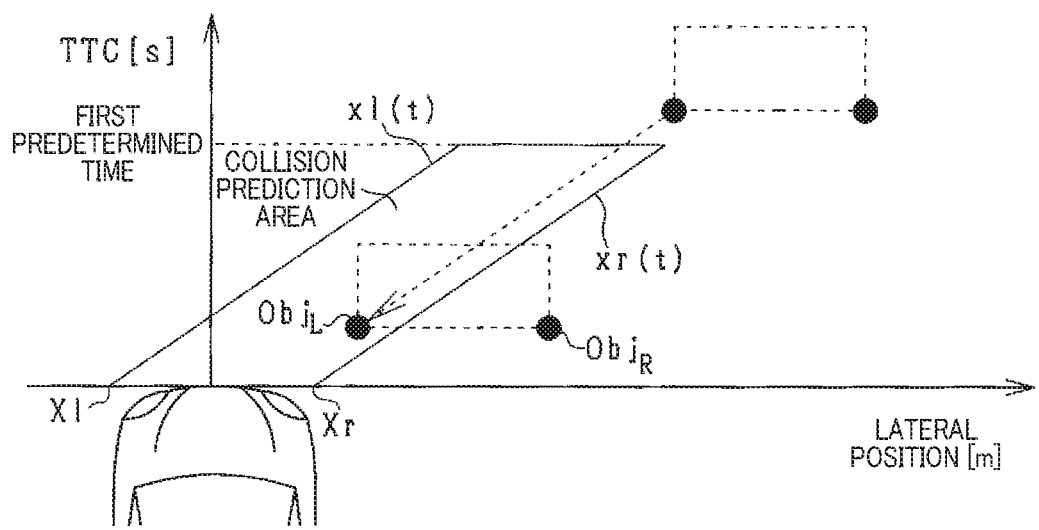
FIG. 3 is a diagram illustrating control performed by the detection ECU according to the present embodiment.

Accordingly, the collision prediction unit 15 of the detection ECU 10 according to the present embodiment sets the lateral position of the collision prediction area based on the speed of the target present in the overlapping detection area and the time-to-collision. Specifically, as illustrated in FIG. 3, the collision prediction unit 15 establishes the collision prediction area in such a manner as to equalize the width of the collision prediction area along the lateral axis with the width of the own vehicle, and set the coverage of the collision prediction area along the longitudinal axis from 0 to the first predetermined time. In this case, the speed of the target along the lateral position axis (positive on the rightward side) at time t is designated as V(t), and the time-to-collision is designated as TTC. Therefore, right end Xr(t) and left end Xl(t) of the collision prediction area are expressed by Equations (1) and (2). The own vehicle front right end Xr expressed in the equation indicates the coordinate position of a point shifted rightward from the center of the own vehicle by half the vehicle width along the lateral position axis. The own vehicle front left end Xl expressed in the equation indicates the coordinate position of a point shifted leftward from the center of the own vehicle by half the vehicle width along the lateral position axis. Accordingly, it is possible to set a target that will pass through the own vehicle so that it is not included within the collision prediction area, and determine that a target present in the collision prediction area may collide with the own vehicle and perform the driving support process to prevent a collision between the target and the own vehicle.

$$Xr(t)=Xr-V(t)\times TTC \quad (1)$$

$$Xl(t)=Xl-V(t)\times TTC \quad (2)$$

In the present embodiment, the target is assumed to be a bicycle. The bicycle is a target that is long in length along the lateral position axis. Accordingly, depending on the situation, the central part of the bicycle along the lateral position axis may not be included in the collision prediction area, but a part of the bicycle might enter the collision prediction area (see FIG. 2). In such a situation, when the bicycle as the target is specified as a point by the lateral position and the time-to-collision in the determination plane, the driving support process cannot be performed properly, and the target and the own vehicle may collide with each other.

To prevent this, the collision prediction unit 15 acquires position information from the image captured by the imaging device 22. The position information relates to both ends of the target along the lateral axis in the determination plane. Accordingly, in the present embodiment, the imaging device 22 corresponds to a both-ends detection unit. As illustrated in FIG. 3, when at least a part of the section between the acquired both ends is within the collision prediction area, the collision prediction unit 15 determines that the target may collide with the vehicle, and thus recognizes the target as a target of the driving support process.

Specifically, the collision prediction unit 15 acquires from the image captured by the imaging device 22, lateral position information about the left end of the target (target left end ObjL) and lateral position information about the right end of the target (target right end ObjR), with respect to the traveling direction of the vehicle. In addition, the collision prediction unit 15 calculates the right end Xr(t) of the collision prediction area at the time to collision with the target calculated by Equation (1), and the left end Xl(t) of the collision prediction area at the time to collision with the target calculated by Equation (2). Then, as expressed in Equation (3), the collision prediction unit 15 determines whether the following relationship is established in the determination plane. Specifically, the relationship is that the lateral position of the target right end ObjR is larger than the lateral position of the left end Xl(t) of the collision prediction area at the calculated time-to-collision, and the lateral position of the right end Xr(t) of the collision prediction area at the calculated time-to-collision is larger than the lateral position of the target left end ObjL. The target satisfying the relationship of Equation (3) is at least partially included in the collision prediction area. That is, even if a target with large lateral width is approaching toward the traveling direction of the vehicle, it is possible to determine a collision between the vehicle and the target with high accuracy.

[Equation 1]

$$\text{AND}\begin{bmatrix} Xl(t) \leq ObjR \\ Objl \leq X_r(t) \end{bmatrix} \quad (3)$$

Figure 4:
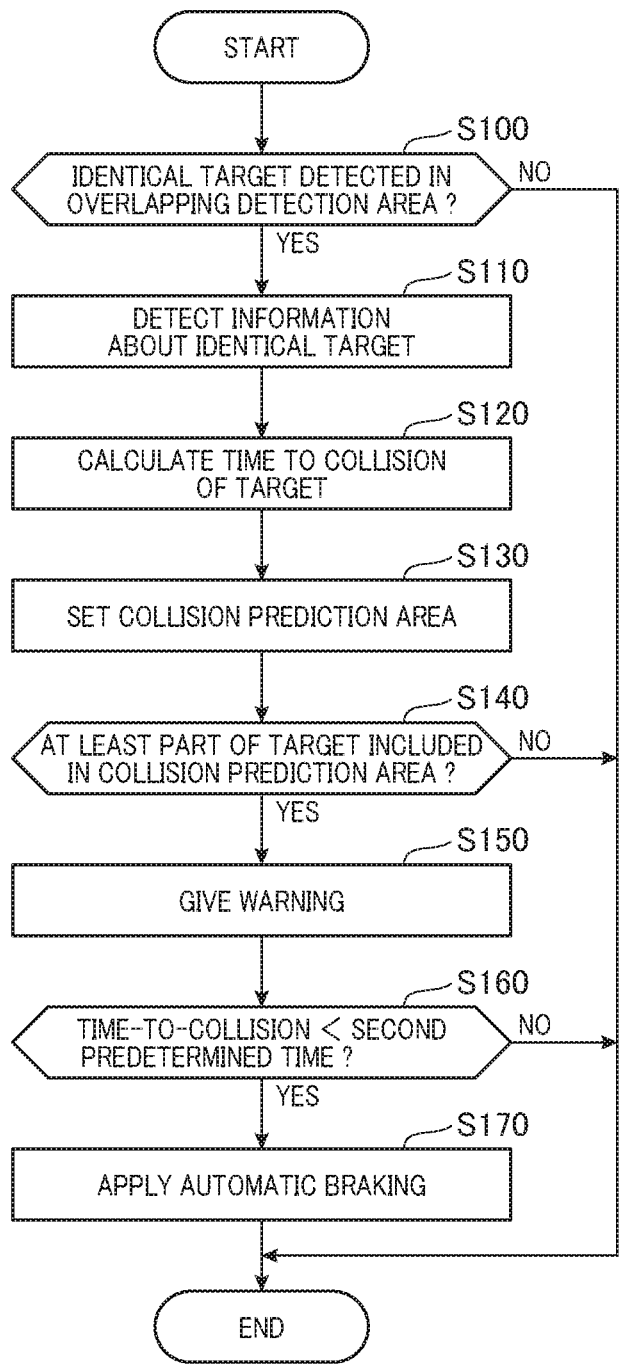
FIG. 4 is a flowchart of the control performed by the detection ECU according to the present embodiment.

In the present embodiment, the support performing unit 16 of the detection ECU 10 performs the driving support control described later with reference to FIG. 4. When the collision prediction unit 15 predicts that the target and the own vehicle will collide with each other, the support performing unit 16 causes the vehicle to perform the driving support to prevent the collision. The detection ECU 10 repeatedly performs the driving support control described in FIG. 4 at predetermined intervals while the power supply for the detection ECU 10 is on.

First, in step S100, the detection ECU 10 determines whether the distance between the radar detection target and the image detection target is within a predetermined range in the overlapping detection area. When the distance between the radar detection target and the image detection target is not within the predetermined range in the overlapping detection area (NO at S100), the detection ECU 10 terminates the present control. When the distance between the radar detection target and the image detection target is within the predetermined range in the overlapping detection area (YES at S100), the detection ECU 10 determines that an identical target has been detected, and proceeds to step S110.

In step S110, the detection ECU 10 acquires from the radar device 21 the relative position, the relative distance, and the relative speed of the target determined as identical target. In this case, the relative position of the target is specified based on the position and azimuth of the target with respect to the own vehicle, which corresponds to the lateral position of the target in the determination plane. The relative distance corresponds to the distance between the own vehicle and the target calculated based on the relative position. The detection ECU 10 also acquires the position information about the both ends of the target from the image captured by the imaging device 22. In step S120, the time-to-collision calculation unit 17 calculates the time-to-collision with the target from the relative speed and relative distance of the target acquired from the radar device 21. In step S130, the collision prediction unit 15 establishes the collision prediction area in the determination plane, based on the information about the target acquired in steps S110 and S120.

In step S140, the detection ECU 10 determines whether at least a part of the target is within the collision prediction area established in step S130. When it is determined that the target is not within the collision prediction area (NO at S140), the detection ECU 10 terminates the present control.

When it is determined that at least a part of the target is within the collision prediction area (YES at S140), the detection ECU 10 proceeds to step S150 where the support performing unit 16 causes the warning device 31 to perform the notification process.

In step S160, the detection ECU 10 determines whether the time to collision with the target is shorter than the second predetermined time. When it is determined that the time to collision with the target is longer than the second predetermined time illustrated in FIG. 7 (NO at S160), the detection ECU 10 terminates the present control. When it is determined that the time to collision with the target is shorter than the second predetermined time (YES at S160), the detection ECU 10 proceeds to step S170 where the support performing unit 16 causes the braking device 32 to perform the automatic braking control, and then terminates the present control.

According to the aforementioned configuration, the present embodiment provides the advantageous effects described below.

The width of the collision prediction area along the lateral position axis is set based on the width of the own vehicle. This makes it possible to determine that a target is present at a position exceeding the width along the lateral position axis is unlikely to collide with the own vehicle. In addition, setting the lateral position of the collision prediction area based on the speed of a target and the time-to-collision makes it possible to determine with high accuracy whether the target approaching at the current speed is likely to collide with the own vehicle. Further, when the right end Xr(t) and left end Xl(t) of the time to collision with the target calculated according to Equations (1) and (2) and the lateral positions of the both ends of the target (the target left end ObjL and target right end ObjR) satisfy the relationship in Equation (3), it can be predicted that at least a part of the target will collide with the own vehicle. Accordingly, even when a target having a large lateral width is approaching toward the traveling direction of the own vehicle, it is possible to determine a collision between the own vehicle and the target with high accuracy. Moreover, it is possible to appropriately determine whether to perform the driving support.

The lateral position of the collision prediction area is set by straight lines with the speed of the target as slopes as described in Equations (1) and (2). Therefore, it is possible to draw in the determination plane, a virtual line of the right end Xr(t) of the collision prediction area determined by Equation (1), and a virtual line of the left end Xl(t) of the collision prediction area determined by Equation (2). These virtual lines are boundary lines in the case where the target running at the current speed collides with the own vehicle. Accordingly, establishing the collision prediction area based on these virtual lines makes it possible to determine that a target passing by the own vehicle without a collision is outside the collision prediction area.

The following modifications may be made to the above embodiment.

In the aforementioned embodiment, the target is assumed to be a bicycle. In this regard, the target is not limited to a bicycle but may be a pedestrian, a motorcycle, or an automobile, for example.

The aforementioned embodiment includes the means for preventing a collision between the own vehicle and the target present in the collision prediction area according to the time to collision with the target. Specifically, the warning device 31 is activated when at least a part of the target is present in the collision prediction area. Additionally, when the braking device 32 is activated when the time to collision with the target present in the collision prediction area is shorter than the second predetermined time. In this regard, the means for preventing a collision with the target are not limited to the warning device 31 and the braking device 32. For example, instead of the automatic braking control by the braking device 32, a steering wheel control unit may be provided so that, when it is determined that the time to collision with the target present in the collision prediction area is shorter than a third predetermined time, the steering wheel can be automatically controlled to avoid a collision with the target. The third predetermined time is set as a time necessary for safely avoiding a collision with the target by the automatic control of the steering wheel, for example.

In the aforementioned embodiment, the fusion determination is made using the radar device 21 and the imaging device 22. In this regard, the fusion determination need not necessarily be made to perform the driving support control. However, a driving support device not including the imaging device 22 but including only the radar device 21 may perform the driving support control. In this case, the radar device 21 is caused to acquire the position information about both ends of the target in the determination plane. In another example, therefore, the radar device 21 corresponds to the both-ends detection unit.

Example 1

In the aforementioned embodiment, the fusion determination is made using the radar device 21 and the imaging device 22. In this regard, the fusion determination need not necessarily be made to perform the driving support control. However, a driving support device including the imaging device 22 but not including the radar device 21 may perform the driving support control. In this case, the driving support device is caused to detect the position and speed of the target from the image captured by the imaging device 22. In Example 1, therefore, the imaging device 22 corresponds to the speed calculation unit.

However, when the speed of a target is detected from the image captured by the imaging device 22, the large part of the image is occupied by the target near the own vehicle, and thus there is a risk that the speed of the target might be incorrectly calculated as being lower than actual one. In this case, it may be incorrectly determined that the target is not within the collision prediction area due to the error in the speed of the target, although the target actually is within the collision prediction area.

Figure 5:
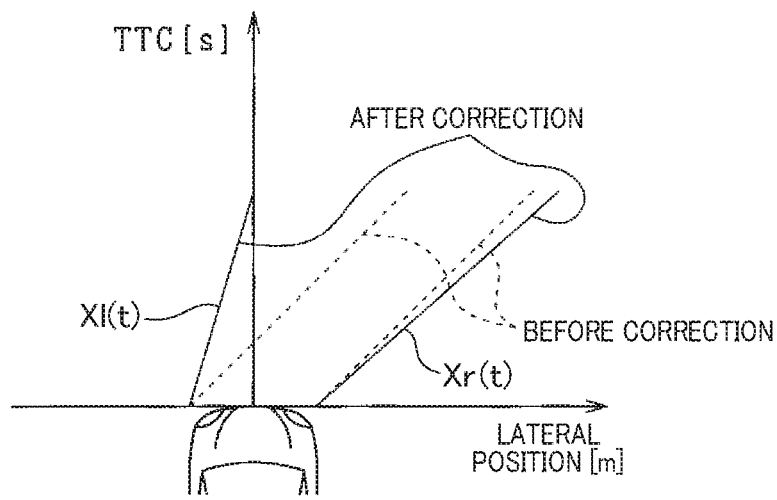
FIG. 5 is a diagram illustrating an example of case where the collision prediction area is corrected.
Figure 6:
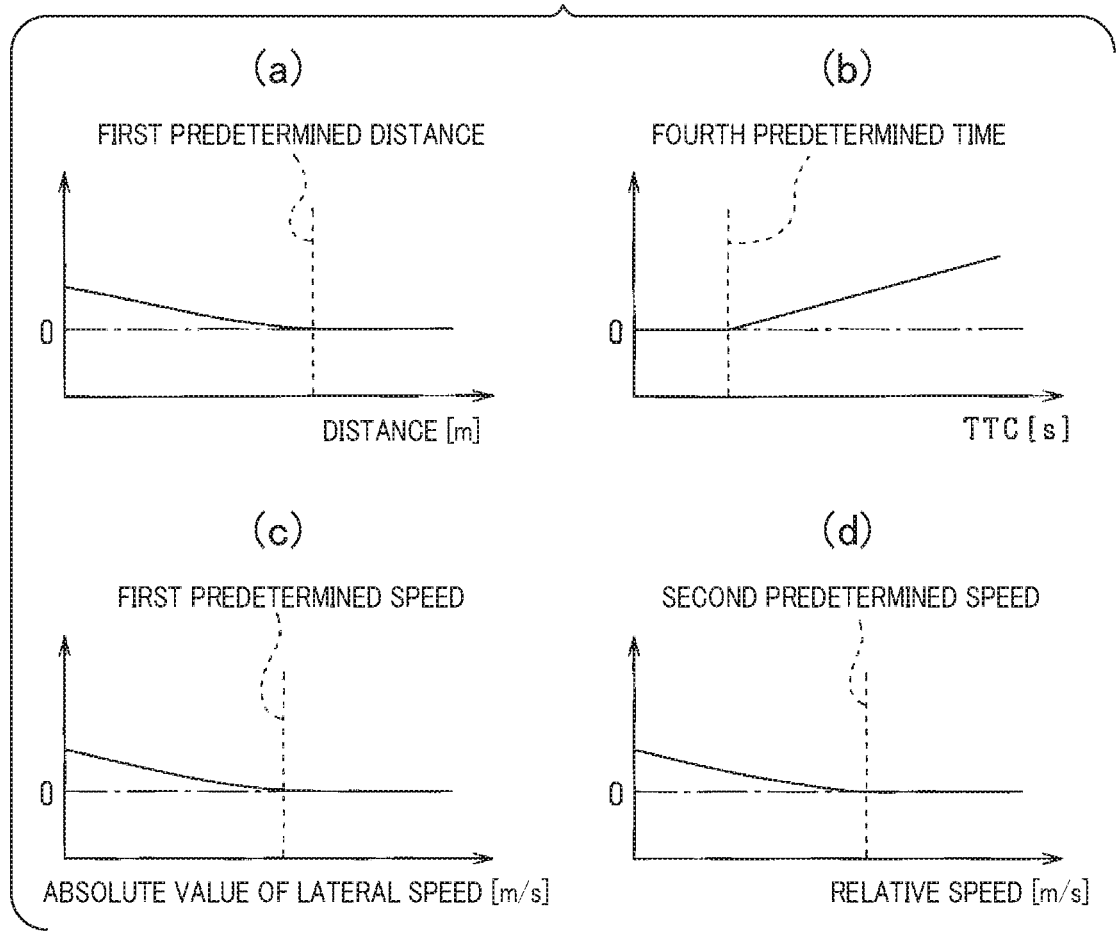
FIG. 6 a graph illustrating change tendencies of a correction value for use in the correction of the collision prediction area.

Accordingly, when the relative distance between the own vehicle and the target is shorter than a first predetermined distance, the collision prediction unit 15 corrects the collision prediction area to be wider in the lateral direction such that the straight line of the right end Xr(t) of the collision prediction area has a larger slope and the straight line of the left end Xl(t) of the collision prediction area has a smaller slope, as illustrated in FIG. 5. Specifically, as described in Equation (4), the slope of the straight line of the right end Xr(t) of the collision prediction area is corrected by multiplying the product of the speed of the target and the time-to-collision by a value calculated by adding a first correction value α to 1. In addition, as described in Equation (5), the slope of the straight line of the left end Xl(t) of the collision prediction area is corrected by multiplying the product of the speed of the target and the time-to-collision, by a value calculated by subtracting the first correction value α from 1. As illustrated in FIG. 6(*a*), the first correction value α is 0 when the relative distance is longer than the first predetermined distance, and tends to be larger than 0 when the relative distance becomes shorter than the first predetermined distance. This allows the target to be included within the collision prediction area even if an error has occurred in the speed of the target calculated using the image captured by the imaging device 22. The slope of the straight line of the right end Xr(t) of the collision prediction area is corrected.

$$Xr(t)=Xr-V(t)\times TTC\times(1+\alpha) \quad (4)$$

$$Xl(t)=Xl-V(t)\times TTC\times(1-\alpha) \quad (5)$$

In Example 1, the slope of the straight line of the right end Xr(t) of the collision prediction area and the slope of the straight line of the left end Xl(t) of the collision prediction area are corrected. In this regard, both the slopes of the straight lines need not necessarily be corrected by using the first correction value α. For example, when correcting the slope of the straight line of the right end Xr(t) of the collision prediction area, the first correction value α may be used to widen the collision prediction area in the lateral direction. Conversely, the slope of the straight line of the left end Xl(t) of the collision prediction area need not be corrected or may be corrected using a value different from the first correction value α.

Example 2

Figure 7:
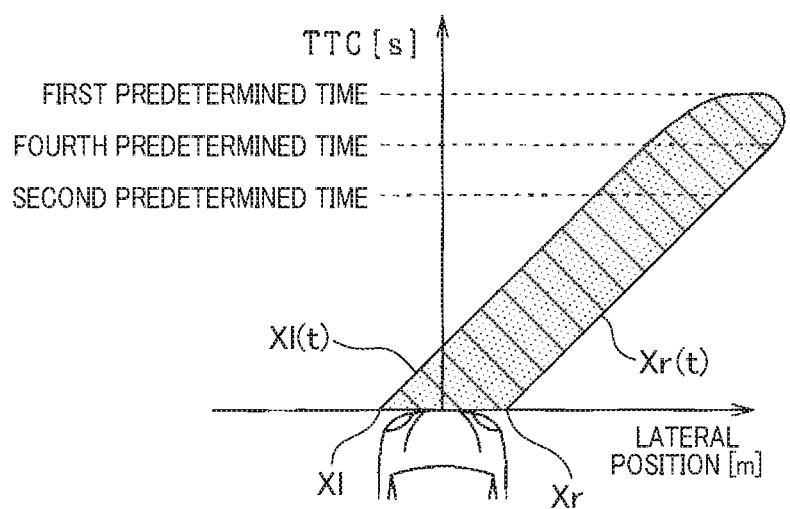
FIG. 7 is a diagram illustrating an example of case where the collision prediction area is corrected.

In the aforementioned embodiment, the width of the collision prediction area along the lateral axis is set to the width of the own vehicle. In this regard, in the collision prediction area in a range in which the time-to-collision is longer than a fourth predetermined time, as illustrated in FIG. 7, the collision prediction unit 15 narrows the width of the collision prediction area along the lateral axis by correcting the slope of the straight line of right end Xr(t) of the collision prediction area to be smaller, and correcting the slope of the straight line of left end Xl(t) of the collision prediction area to be larger. The fourth predetermined time is set to be longer than the second predetermined time and shorter than the first predetermined time. Specifically, as described in Equation (6), the slope of the straight line of the right end Xr(t) of the collision prediction area is corrected by multiplying a value calculated by subtracting a second correction value β from 1, by the product of the speed of the target and the time-to-collision. In addition, as described in Equation (7), the slope of the straight line of the left end Xl(t) of the collision prediction area is corrected by multiplying a value calculated by adding the second correction value β to 1, by the product of the speed of the target and the time-to-collision. The second correction value β is 0 when the time-to-collision is shorter than the fourth predetermined time, and tends to be larger than 0 when the time-to-collision becomes longer than the fourth predetermined time, as illustrated in FIG. 6(*b*).

$$Xr(t)=Xr-V(t)\times TTC\times(1-\beta) \quad (6)$$

$$Xl(t)=Xl-V(t)\times TTC\times(1+\beta) \quad (7)$$

It is predicted that the target detected in the range where the time-to-collision is longer than the fourth predetermined time will take time to collide with the own vehicle, and the target or the own vehicle might accelerate or decelerate from this time forward. Therefore, even though the target and the own vehicle are currently on collision paths, these paths may change hereafter such that the target and the own vehicle do not collide with each other. Accordingly, the slopes of the straight lines are corrected according to Equations (6) and (7) to narrow the width of the collision prediction area along the lateral axis. Therefore, only targets that are highly likely to collide with the own vehicle are detected. This makes it possible to eliminate the need to determine whether to perform the driving support for the targets that will soon be outside the collision prediction area due to acceleration or deceleration of the target or the own vehicle, thereby reducing the frequency of performing the driving support control.

In Example 2, the slope of the straight line of the right end Xr(t) of the collision prediction area and the slope of the straight line of the left end Xl(t) of the collision prediction area are corrected. In this regard, both the slopes of the straight lines need not be necessarily corrected by using the second correction value $\beta$. For example, when correcting the slope of the straight line of the right end Xr(t) of the collision prediction area, the first correction value $\beta$ may be used to narrow the width of the collision prediction area along the lateral axis. Meanwhile, the slope of the straight line of the left end Xl(t) of the collision prediction area need not be corrected, or may be corrected using a value different from the second correction value $\beta$.

Example 3

Figure 8:
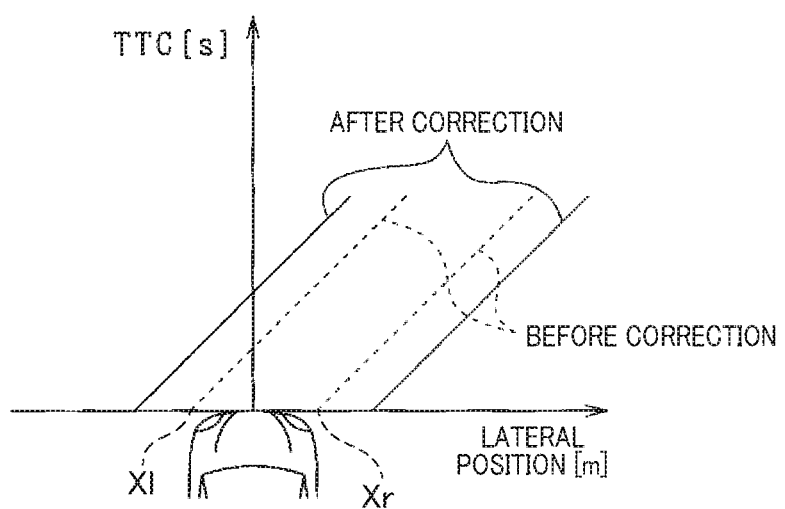
FIG. 8 is a diagram illustrating an example of case where the collision prediction area is corrected.
Figure 9:
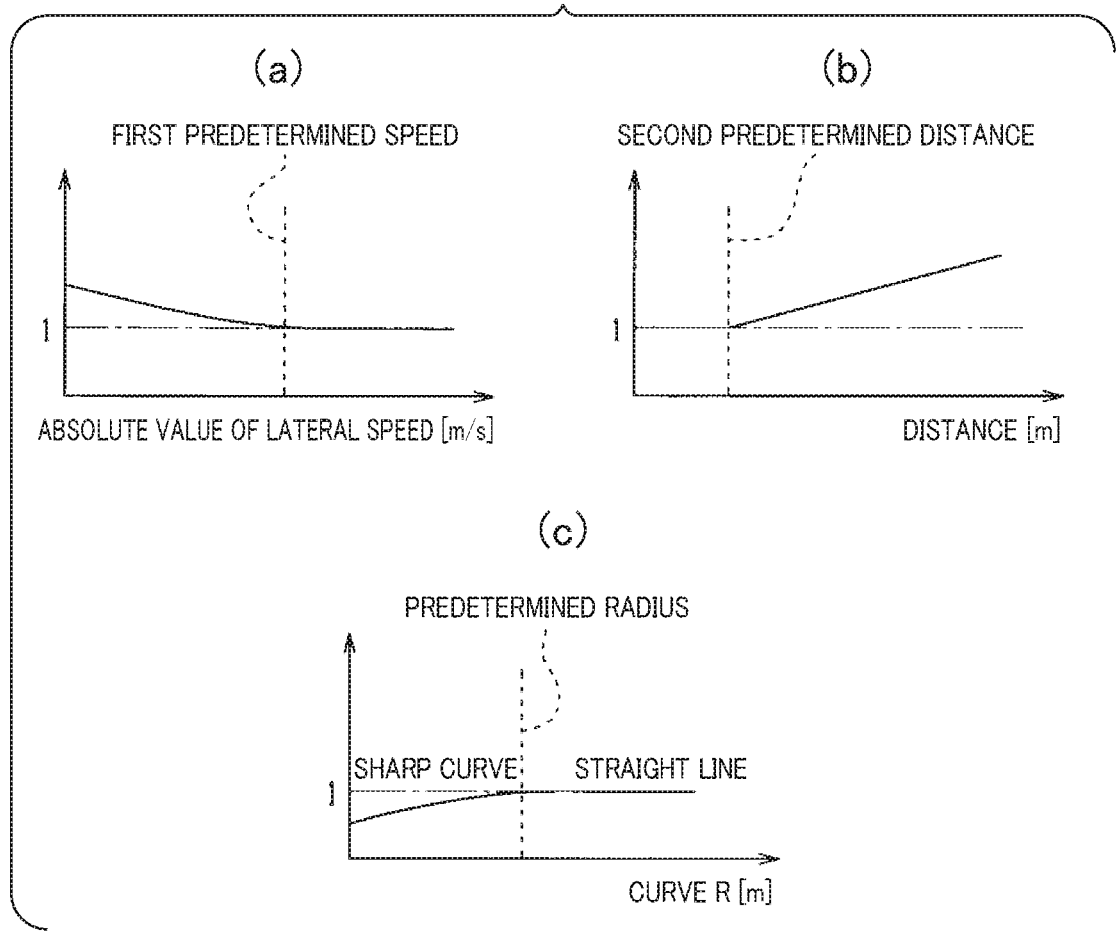
FIG. 9 is a graph illustrating change tendencies of a correction coefficient for use in the correction of the collision prediction area.

In the aforementioned embodiment, the width of the collision prediction area along the lateral axis is set to the width of the own vehicle. In this regard, when the speed of a target along the lateral position axis in the determination plane is lower than the first predetermined speed, in particular, when the target is a pedestrian, it is presumed that the speed of the target will frequently increase or decrease. In this case, even though it is predicted that the target will be outside the collision prediction area and pass by the own vehicle, the target may change the direction to a path of future collision with the own vehicle due to accidental acceleration or deceleration of the target, and may enter the collision prediction area. In such a situation, when the speed of the target is lower than the first predetermined speed, the collision prediction unit 15 corrects, as illustrated in FIG. 8, the lateral width of the collision prediction area to increase to the both sides. Specifically, as described in Equations (8) and (9), the collision prediction unit 15 corrects the lateral width of the collision prediction area by multiplying each of the own vehicle front right end Xr and the own vehicle front left end Xl, by a first correction coefficient $\gamma$. The first correction coefficient $\gamma$ is 1 when the absolute value of the speed of the target is higher than the first predetermined speed, and tends to be larger than 1 when the absolute value of the speed of the target becomes lower than the first predetermined speed, as illustrated in FIG. 9(a). This makes it possible to predict a collision between the target and the own vehicle with high accuracy even in the situation where the behavior of the target is likely to change.

$$Xr(t)=Xr\times\gamma-V(t)\times TTC \qquad (8)$$

$$Xl(t)=Xl\times\gamma-V(t)\times TTC \qquad (9)$$

In Example 3, when the speed of the target is lower than the first predetermined speed, the collision prediction unit 15 may increase/correct the width of the collision prediction area along the lateral position axis. Additionally, the collision prediction unit 15 may correct the slopes of the straight lines according to Equations (4) and (5) to widen the collision prediction area in the lateral direction, thereby further increasing the collision prediction area. A specific method for correcting the slopes of the straight lines will be described. According to Equation (4), the slope of the straight line of the right end Xr(t) of the collision prediction area is corrected by multiplying the product of the speed of the target and the time-to-collision, by a value calculated by adding a third correction value $\Delta$ to 1. In addition, according to Equation (5), the slope of the straight line of the left end Xl(t) of the collision prediction area is corrected by multiplying the product of the speed of the target and the time-to-collision, by a value calculated by subtracting the third correction value $\Delta$ from 1. The third correction value $\Delta$ is 0 when the speed of the target is higher than the first predetermined speed, and tends to be larger than 0 when the speed of the target becomes lower than the first predetermined speed as illustrated in FIG. 6(c). This makes it possible to predict a collision between the target and the own vehicle more reliably with high accuracy in the situation where the behavior of the target is likely to change.

In Example 3, when the speed of the target is lower than the first predetermined speed, the collision prediction unit 15 increases/corrects the width of the collision prediction area along the lateral position axis. In this regard, instead of increasing/correcting the width of the collision prediction area along the lateral position axis, the collision prediction unit 15 may correct the slopes of the straight lines correct according to Equations (4) and (5) to widen the collision prediction area in the lateral direction to increase the collision prediction area.

In Example 3, when the speed of the target is lower than the first predetermined speed, the collision prediction unit 15 increases/corrects the width of the collision prediction area along the lateral position axis. In this regard, when the relative distance between the target and the own vehicle is longer than a second predetermined distance, the collision prediction unit 15 may increase/correct the width of the collision prediction area along the lateral position axis. Specifically, the collision prediction unit 15 corrects the lateral width of the collision prediction area by multiplying each of the own vehicle front right end Xr and the own vehicle front left end Xl, by a second correction coefficient E, according to Equations (8) and (9). The second correction coefficient E is 1 when the relative distance is shorter than the second predetermined distance, and tends to be larger than 1 as the relative distance becomes longer than the second predetermined distance, as illustrated in FIG. 9(b)

When the target and the own vehicle are distant from each other, the accuracy of the information about the target detected by the radar device 21 becomes low. Accordingly, it may be detected that the target is not within the collision prediction area due to an error in the information about the target, although the target actually is within the collision prediction area. Therefore, when the relative distance between the target and the own vehicle is longer than the second predetermined distance, the width of the collision prediction area along the lateral position axis is increased/corrected. This allows the target to be included within the increased/corrected collision prediction area even if an error has occurred in the information about the target detected by the radar device 21.

In Example 3, when the speed of the target is lower than the first predetermined speed, the collision prediction unit 15 increases/corrects the width of the collision prediction area along the lateral position axis. In this regard, when the relative speed of the target and the own vehicle is lower than a second predetermined speed, the collision prediction unit 15 may correct the slopes of the straight lines to widen the collision prediction area in the lateral direction according to Equations (4) and (5). Specifically, according to Equation (4), the collision prediction unit 15 corrects the slope of the straight line of the right end Xr(t) of the collision prediction area, by multiplying the product of the speed of the target and the time-to-collision, by a value calculated by adding a fourth correction value to 1. In addition, according to Equation (5), the collision prediction unit 15 corrects the slope of the straight line of the left end Xl(t) of the collision prediction area by multiplying the product of the speed of the target and the time-to-collision, by a value calculated by subtracting the fourth correction value $\zeta$ from 1. The fourth correction value $\zeta$ is 0 when the relative speed is higher than the second predetermined speed, and tends to be larger than 0 as the relative speed becomes lower than the second predetermined speed, as illustrated in FIG. 6(d).

When the relative speed of the target and the own vehicle is low, an error might occur in the time-to-collision. In this case, the position of the target is shifted in the determination plane, and it may be detected that the target is not within the collision prediction area due to the error in the calculated time-to-collision, although the target actually is within the collision prediction area. Therefore, when the relative speed of the target and the own vehicle is lower than the second predetermined speed, the collision prediction unit 15 corrects the slopes of the straight lines to widen the collision prediction area in the lateral direction according to Equations (4) and (5). This allows the target to be included within the increased/corrected collision prediction area even if an error has occurred in the calculated time-to-collision in the situation where the speed of the target relative to the own vehicle is low.

Figure 10:
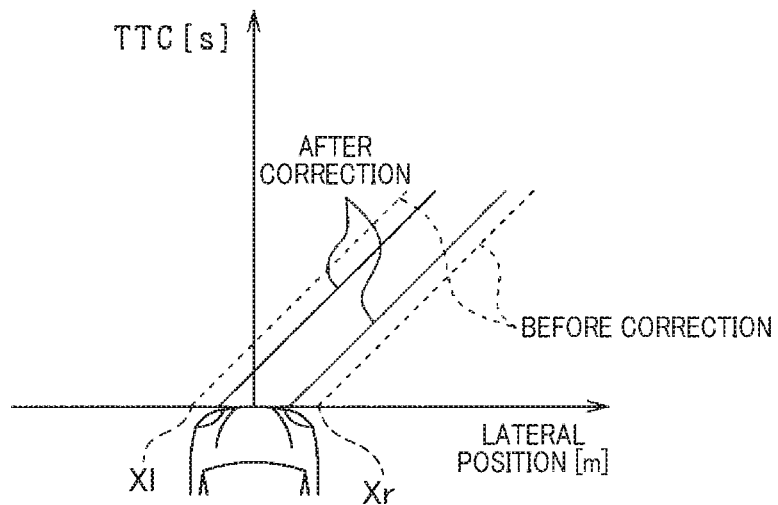
FIG. 10 is a diagram illustrating an example of case where the collision prediction area is corrected.

In Example 3, when the speed of the target is lower than the first predetermined speed, the collision prediction unit 15 increases/corrects the width of the collision prediction area along the lateral position axis. In this regard, when the driving support device 100 includes a means for detecting the turning angular speed of the own vehicle (for example, a yaw rate sensor), the width of the collision prediction area along the lateral position axis may be corrected depending on the magnitude of the curvature radius (curve R) calculated based on the turning angular speed and the speed of the own vehicle. When the curve R is shorter than a predetermined radius, the collision prediction unit 15 corrects the lateral width of the collision prediction area to decrease from the both sides, as illustrated in FIG. 10. Specifically, the collision prediction unit 15 corrects the lateral width of the collision prediction area by multiplying each of the own vehicle front right end Xr and the own vehicle front left end Xl, by a third correction coefficient $\eta$ according to Equations (8) and (9).

The third correction coefficient $\eta$ is 1 when the curve R is longer than the predetermined radius, and tends to be smaller than 1 as the curve R becomes shorter than the predetermined radius, as illustrated in FIG. 9(c).

When the curve R is shorter than the predetermined radius and the own vehicle is greatly turning with respect to the traveling direction of the own vehicle before the turning, the position of the own vehicle relative to the target changes substantially. In this case, the collision prediction area cannot be properly developed and the braking device 32 may be erroneously caused to perform the automatic braking control. Accordingly, when the curve R is shorter than the predetermined radius, decreasing and correcting the width of the collision prediction area along the lateral position axis makes it possible to prevent incorrect execution of the automatic braking control by the braking device 32.

In Example 3 and another example applied to Example 3, the lateral width of the collision prediction area is corrected by multiplying the own vehicle front right end Xr and the own vehicle front left end Xl, by the same correction coefficient. In this regard, the own vehicle front right end Xr and the own vehicle front left end Xl need not necessarily be multiplied by the same correction coefficient. For example, the own vehicle front right end Xr may be multiplied by a correction coefficient, however the own vehicle front left end Xl may not be multiplied by the correction coefficient, or may be multiplied by a correction coefficient different from the correction coefficient used to correct the own vehicle front right end Xr.

In still another example applied to Example 3, the slope of the straight line of the right end Xr(t) of the collision prediction area and the slope of the straight line of the left end Xl(t) of the collision prediction area are corrected using the same correction value. In this regard, the slopes of the straight lines need not necessarily be corrected using the same correction value. For example, when correcting the slope of the straight line of the right end Xr(t) of the collision prediction area, the third correction value $\Delta$ or the fourth correction value $\zeta$ may be used to widen the collision prediction area in the lateral direction. Meanwhile, the slope of the straight line of the left end Xl(t) of the collision prediction area need not be corrected, or may be corrected using a correction value different from the third correction value $\Delta$ or the fourth correction value $\zeta$.

In Example 1, and another example applied to Example 1, Example 2, still another example applied to Example 2, Example 3, and still another example applied to Example 3, the coverage of the collision prediction area is corrected depending on predetermined conditions. The collision prediction area is an area with a combination of a notification area where the warning device 31 performs the notification process and an automatic braking area where the braking device 32 performs the automatic braking control. Therefore, the correction controls described in Example 1, still another example applied to Example 1, Example 2, still another example applied to Example 2, Example 3, and still another example applied to Example 3 are applied to both the notification area and the automatic braking area. In this regard, different correction controls may be applied to the notification area and the automatic braking area such as the correction control in Example 1 applied to the notification area and the correction control in Example 2 applied to the automatic braking area, for example.

The present disclosure has been described based on embodiments, however it should be understood that the present disclosure is not limited to these embodiments and configurations.

The scope of the present disclosure should encompass various modifications or equivalents. Further, various combinations or modes, or other combinations or modes constituted by one or more elements of the various combinations or modes are included within the category or idea of the present disclosure.

PARTIAL REFERENCE SIGNS LIST

10 . . . Detection ECU
21 . . . Radar device
22 . . . Imaging device

The invention claimed is:

1. A driving support device comprising:
 a target detection unit that detects a target moving in a direction crossing a traveling direction of a vehicle;
 a support performing unit configured to, in response to a collision prediction unit predicting a collision between the target and the vehicle, cause the vehicle to perform driving support for preventing the collision;

a speed calculation unit that calculates a speed of the target;

a time-to-collision calculation unit configured to calculate a time-to-collision as a prediction time period until an occurrence of a collision between the target and the vehicle based on information about the target detected by the target detection unit; and a both-ends detection unit that detects both ends of the target detected by the target detection unit in a direction orthogonal to the traveling direction of the vehicle, wherein the collision prediction unit establishes a collision prediction area as an area in a determination plane defined by a lateral position axis indicating a lateral position with respect to the vehicle in a lateral direction orthogonal to the traveling direction of the vehicle and a prediction time period axis indicating the time-to-collision set in the traveling direction of the vehicle, and the collision prediction unit predicts a collision with the target depending on whether at least a part of a section between the both ends of the target detected by the both-ends detection unit is within the collision prediction area, a width of the collision prediction area along the lateral position axis is set based on a width of the vehicle, the lateral position of the collision prediction area comprising a right end and a left end, each of the right and left ends are calculated by multiplying the speed of the target by the time-to-collision, a distance between the right end and the left end along the lateral position axis is equal to the width of the vehicle, and the lateral position of the collision prediction area is set in the determination plane by two straight lines indicating the speed of the target calculated, as slopes, in the direction of the lateral position axis at a given interval, by the speed calculation unit, the slopes having a tilt to the prediction time period axis.

2. The driving support device according to claim 1, wherein of the both ends of the target detected by the both-ends detection unit;

an end portion positioned on a left side with respect to the traveling direction of the vehicle is set as a left end portion and an end portion positioned on a right side with respect to the traveling direction of the vehicle is set as a right end portion, a left end of the collision prediction area along the lateral position axis with respect to the traveling direction of the vehicle is set as an area left end and a right end of the collision prediction area along the lateral position axis with respect to the traveling direction of the vehicle is set as an area right end, and the collision prediction unit predicts a collision with the target in response to the lateral position of the left end portion of the target being smaller than the lateral position of the area right end and the lateral position of the right end portion of the target being larger than the lateral position of the area left end with respect to the time-to-collision calculated by the time-to-collision calculation unit in the determination plane.

3. The driving support device according to claim 2, wherein, in response to a relative distance between the vehicle and the target being shorter than a first predetermined distance, the collision prediction unit is configured to correct the slopes of the two straight lines to increase a width of the collision prediction area in the lateral direction of the lateral position axis depending on the prediction time period axis.

4. The driving support device according to claim 2, wherein, in response to the speed of the target calculated by the speed calculation unit being lower than a first predetermined speed, the collision prediction unit is configured to correct the slopes of the two straight lines to widen the collision prediction area in the direction of the lateral position axis.

5. The driving support device according to claim 2, wherein, in response to the speed of the target relative to the vehicle being lower than a second predetermined speed, the collision prediction unit is configured to correct the slopes of the two straight lines to widen the collision prediction area in the direction of the lateral position axis.

6. The driving support device according to claim 2, wherein the collision prediction unit corrects the slopes of the two straight lines to narrow a width of the collision prediction area in the direction of the lateral position axis in a range where the time-to-collision calculated by the time-to-collision calculation unit is longer than a predetermined time.

7. The driving support device according to claim 2, wherein, in response to a relative distance between the target and the vehicle being longer than a second predetermined distance, the collision prediction unit increases a width of the collision prediction area along the lateral position axis.

8. The driving support device according to claim 2, wherein, in response to the speed of the target calculated by the speed calculation unit being lower than a predetermined speed, the collision prediction unit increases and corrects the width of the collision prediction area along the lateral position axis.

9. The driving support device according to claim 1, wherein, in response to a relative distance between the vehicle and the target being shorter than a first predetermined distance, the collision prediction unit is configured to correct the slopes of the two straight lines to increase a width of the collision prediction area in the direction of the lateral position axis depending on the prediction time period axis.

10. The driving support device according to claim 1, wherein, in response to the speed of the target calculated by the speed calculation unit being lower than a first predetermined speed, the collision prediction unit is configured to correct the slopes of the two straight lines to widen the collision prediction area in the direction of the lateral position axis.

11. The driving support device according to claim 1, wherein, in response to the speed of the target relative to the vehicle being lower than a second predetermined speed, the collision prediction unit is configured to correct the slopes of the two straight lines to widen the collision prediction area in the direction of the lateral position axis.

12. The driving support device according to claim 1, wherein the collision prediction unit corrects the slopes of the two straight lines to narrow a width of the collision prediction area in the direction of the lateral position axis in a range where the time-to-collision calculated by the time-to-collision calculation unit is longer than a predetermined time.

13. The driving support device according to claim 1, wherein, in response to a relative distance between the target and the vehicle being longer than a second predetermined distance, the collision prediction unit increases a width of the collision prediction area along the lateral position axis.

14. The driving support device according to claim 1, wherein, in response to the speed of the target calculated by the speed calculation unit being lower than a predetermined speed, the collision prediction unit increases and corrects the width of the collision prediction area along the lateral position axis.

15. The driving support device according to claim 1, wherein, in response to the vehicle is turning at an angle larger than a predetermined angle, the collision prediction unit decreases and corrects the width of the collision prediction area along the lateral position axis.

16. The driving support device according to claim 1, wherein the target is a bicycle.

17. The driving support device according to claim 1, wherein the two straight lines are parallel to each other.

18. A driving support method comprising:
a target detection step of detecting a target moving in a direction crossing a traveling direction of a vehicle;
a collision prediction step of predicting a collision between the target detected in the target detection step and the vehicle;
a support performing step of, in response to a collision between the target and the vehicle being predicted in the collision prediction step, causing the vehicle to perform driving support for preventing the collision;
a speed calculation step of calculating a speed of the target;
a time-to-collision calculation step of calculating a time-to-collision as a prediction time period until an occurrence of a collision between the target and the vehicle based on information about the target detected in the target detection step; and
a both-ends detection step of detecting both ends of the target detected in the target detection step in a direction orthogonal to the traveling direction of the vehicle, wherein
in the collision prediction step, a collision prediction area is established as an area in a determination plane defined by a lateral position axis indicating a position with respect to the vehicle in a lateral direction orthogonal to the traveling direction of the vehicle and a prediction time period axis indicating the time-to-collision in the traveling direction of the vehicle, and a collision with the target is predicted depending on whether at least a part of a section between the both ends of the target detected in the both-ends detection step is within the collision prediction area in the determination plane,
a width of the collision prediction area along the lateral position axis is set based on a width of the vehicle,
a lateral position of the collision prediction area comprising a right end and a left end, each of the right and left ends are calculated by multiplying the speed of the target by the time-to-collision, a distance between the right end and the left end along the lateral position axis is equal to the width of the vehicle, and
the lateral position of the collision prediction area is set in the determination plane by two straight lines indicating the speed of the target calculated, as slopes, in the direction of the lateral position axis at a given interval, the slopes having a tilt to the prediction time period axis.

19. The driving support method according to claim 18, wherein of the both ends of the target detected in the both-ends detection step, an end portion positioned on a left side with respect to the traveling direction of the vehicle is set as a left end portion and an end portion positioned on a right side with respect to the traveling direction of the vehicle is set as a right end portion,
a left end of the collision prediction area along the lateral position axis with respect to the traveling direction of the vehicle is set as area left end and a right end of the collision prediction area along the lateral position axis with respect to the traveling direction of the vehicle is set as area right end, and
in the collision prediction step, a collision with the target is predicted in response to the lateral position of the left end portion of the target being smaller than the lateral position of the area right end and the lateral position of the right end portion of the target being larger than the lateral position of the area left end with respect to the time-to-collision calculated in the determination plane in the time-to-collision calculation step.

* * * * *